(12) United States Patent
Morawski

(10) Patent No.: US 6,818,174 B2
(45) Date of Patent: Nov. 16, 2004

(54) PROCESS FOR MANUFACTURING A TOOTHBRUSH

(75) Inventor: Linda Mary Morawski, Norton, MA (US)

(73) Assignee: McNeil-PPC, Inc., Skillman, NJ (US)

( * ) Notice: Subject to any disclaimer, the term of this patent is extended or adjusted under 35 U.S.C. 154(b) by 228 days.

(21) Appl. No.: 10/101,126

(22) Filed: Mar. 19, 2002

(65) Prior Publication Data

US 2002/0149139 A1 Oct. 17, 2002

Related U.S. Application Data

(63) Continuation of application No. 09/740,741, filed on Dec. 19, 2000, now abandoned.

(51) Int. Cl.[7] .............................................. B29D 22/00
(52) U.S. Cl. ....................................... 264/572; 264/573
(58) Field of Search ................................. 264/572, 573

(56) References Cited

U.S. PATENT DOCUMENTS 6,159,415 A * 12/2000 Tanada ........................ 264/513

FOREIGN PATENT DOCUMENTS

| EP | 0 668 140 B1 | 2/1995 |
| EP | 0 721 832 B1 | 12/1995 |
| WO | WO 97/44175 A1 | 11/1997 |

OTHER PUBLICATIONS

PCT Search Report—PCT/US01/45854—Date of Mailing of the International Search Report Apr. 23, 2002.
Patent Abstracts of Japan, vol. 1996, No. 2, (Feb. 29, 1996) Sekisui Chem Co. Ltd.
Patent Abstracts of Japan, vol. 1996, No. 5, (May 31, 1996) Miyagawa Kasei Ind. Co. Ltd.
Patent Abstracts of Japan, vol. 16, No. 72 (M–1213) (Feb. 21, 1992) Mazda Motor Corp.
Patent Abstracts of Japan, vol. 1995, No. 7, (Aug. 31, 1995) Gogou Kagaku KK.

* cited by examiner

Primary Examiner—Suzanne E. McDowell
(74) Attorney, Agent, or Firm—Lawrence D. Schuler

(57) ABSTRACT

A process for manufacturing hollow handled toothbrushes is disclosed. The process includes; a) providing a toothbrush mold having a head portion, a base portion, a toothbrush cavity located between said head and end portions and having walls, an injection port for molten plastic, and a gas injection port, wherein the gas injection port is positioned in the end of the base portion of the mold so that gas is injected into the mold cavity substantially centrally thereof and in a direction parallel to the longitudinal axis of the mold; b) injecting a predetermined amount of a molten plastic into the mold cavity to partially fill the cavity; and c) injecting at least one gas through the gas injection port into the cavity to direct the molten plastic against the walls of the mold cavity.

8 Claims, 2 Drawing Sheets

PROCESS FOR MANUFACTURING A TOOTHBRUSH

CROSS REFERENCE TO RELATED APPLICATIONS

Figure 1:
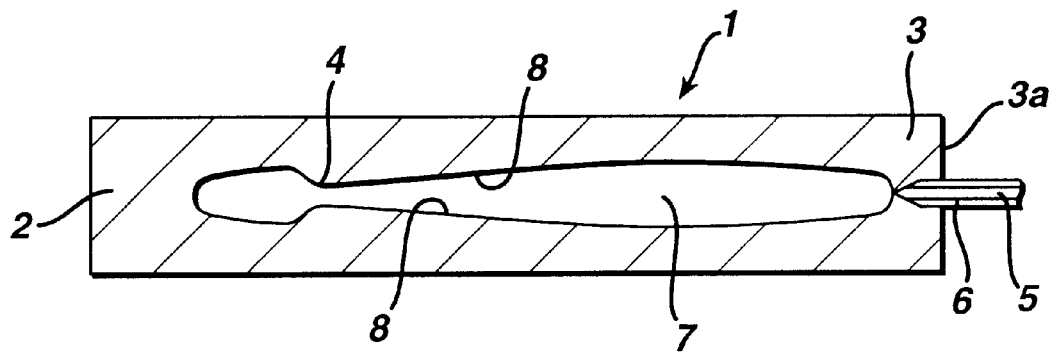

This is a continuation of application Ser. No. 09/740,741, filed Dec. 19, 2000, now abandoned.

FIELD OF THE INVENTION

This patent relates to an improved process for manufacturing a toothbrush. More specifically, the patent relates to a process for manufacturing hollow handled toothbrushes. The process utilizes a gas which is injected from a specific location in a toothbrush mold to assist in blowing a molten plastic therethrough. The injection of the gas in a specific location results in a more efficient process for manufacturing hollow handled toothbrushes.

DESCRIPTION OF THE PRIOR ART

Toothbrushes are typically manufactured using an injection molding process. The injection molding process is characterized by providing a mold in the shape of the toothbrush and injecting molten plastic through a hot channel nozzle into the mold. The toothbrush is then cooled and ejected from the mold.

Toothbrushes may be difficult to handle for several reasons. Children may have difficulty handling toothbrushes due to the size of the child's hands. People with arthritis also sometimes have difficulty handling toothbrushes, due to difficulty in flexing the joints in their hands. Handicapped people may also have difficulty handling toothbrushes. There has been a recent trend to provide toothbrushes with relatively large cross section handles to make handling the toothbrush easier. Additionally, the larger cross section handles on the toothbrushes may be better for the user from an ergonomics point of view.

The manufacture of toothbrushes with larger cross section handles has several drawbacks. Firstly, the toothbrush is more expensive due to the use of more plastic to make the toothbrush. Secondly, the cost of manufacture is increased because the time to cool the toothbrush increases. The increase in cooling time is due to the increased amount of hot plastic and the larger cross section of the toothbrush. Accordingly, there is a need for a more efficient process for making toothbrushes with larger cross section handles.

European Patent No. EP 668140 discloses the use of air assist technology to make toothbrushes with large cross section handles. In the process, molten plastic is injected near the base of the toothbrush handle, perpendicular to the lengthwise direction of the toothbrush mold to partially fill the toothbrush mold. A hot needle is then inserted into the molten plastic, also near the base of the toothbrush handle and also perpendicular to the lengthwise direction of the toothbrush mold. A gas is blown through the needle to press the molten plastic against the walls of the toothbrush mold. The disclosed process may be modified to inject a separate, less expensive polymer in place of the gas, in which case there is produced a solid handle in which the interior portions are made from said separate polymer. In either case, the process is completed by injecting a small amount of plastic to close the hole left by the needle.

European Patent No. EP 721832 also discloses the use of air assist technology to make toothbrushes with large cross section handles. In the disclosed process, molten plastic is injected near the head of the toothbrush mold, perpendicular to the lengthwise direction of the toothbrush mold to partially fill the toothbrush mold. A hot needle is then inserted into the molten plastic, also near the head of the toothbrush, and also perpendicular to the lengthwise direction of the toothbrush mold. A gas is then blown through the needle to press the molten plastic against the walls of the toothbrush mold. The process includes transferring the hollow handled brush to a second mold and injecting a separate plastic to fill the toothbrush handle.

We have found that gas injected just above the base of the toothbrush handle, perpendicular to the lengthwise direction of the toothbrush mold, as taught in European Patent No. EP 668140, may result in inadequate hollowing of the toothbrush handle, i.e., some portions of the previously injected polymer remain as a "mound" near the gas injection point and are not uniformly distributed against the walls of the mold. Additionally, it may be difficult to control the flow of the gas sufficiently to prevent hollowing of the toothbrush neck. Depending on the inherent strength of the polymer being used, it may be desirable to avoid formation of neck portions which are hollow.

We have also found that the gas injected near the neck of the toothbrush, perpendicular to the lengthwise direction of the toothbrush mold, as taught in European Patent No. EP 721832, may result in inadequate hollowing of the toothbrush handle. Additionally, the process is likely to lead to a hollowing of the toothbrush neck.

Therefore, despite the disclosure of the references, there is a continuing need for a more efficient process for making toothbrushes with large cross section handles.

SUMMARY OF THE INVENTION

The present invention provides a process for manufacturing a toothbrush including: a) providing a toothbrush mold having a head portion, a base portion, a toothbrush cavity located between said head portion and said base portion and having walls, an injection port for injecting molten plastic, and a gas injection port for injecting a gas, wherein the gas injection port is positioned in the end of the base portion of the mold so that gas is injected into the mold cavity substantially centrally thereof and in a direction parallel to the longitudinal axis of the mold; b) injecting a predetermined amount of a molten plastic into the cavity to partially fill the mold cavity; and c) injecting a gas (or a mixture of gases) through the gas injection port to direct, or force, the molten plastic into contact with the walls of the mold cavity, thereby forming a toothbrush having at least some portions which are hollow.

DETAILED DESCRIPTION OF PREFERRED EMBODIMENTS

The present invention utilizes an injection molding apparatus in the manufacture of toothbrushes with hollow handles. Injection molding machines are well known in the art. Any such machine may be utilized in the present invention. The present invention is herein described with respect to FIGS. 1 through 5 of the appended drawings. The key to the present invention is the location of the gas injection port. In order to control the gas assist process of manufacturing toothbrushes at least portions of which are hollow and in which the amount of plastic utilized is minimized, the gas injection port (5) must be positioned in the base end (3) of the toothbrush mold (1) such that gas flows into the mold cavity substantially centrally thereof.

Figure 2:
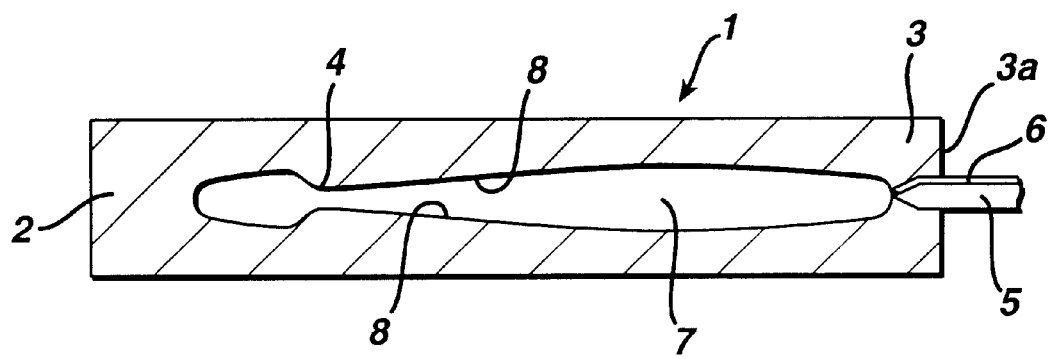
Figure 3:
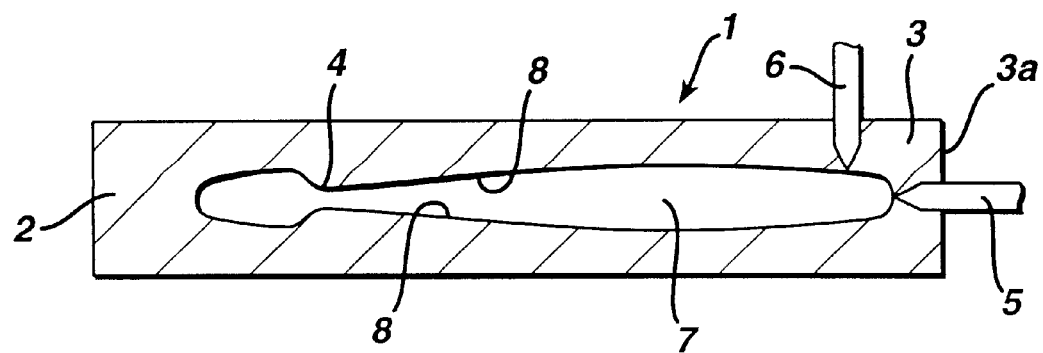
Figure 4:
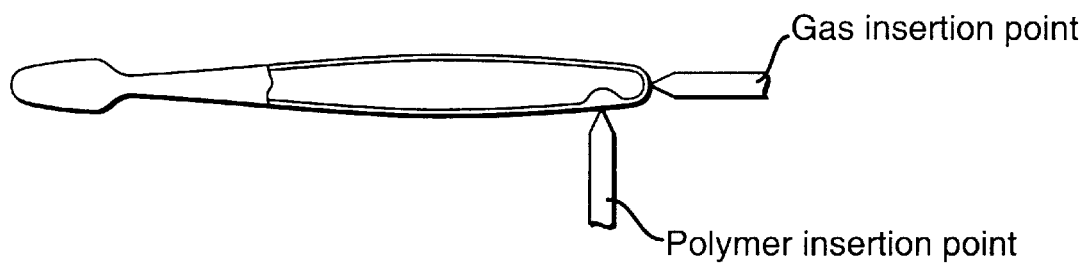
Figure 5:
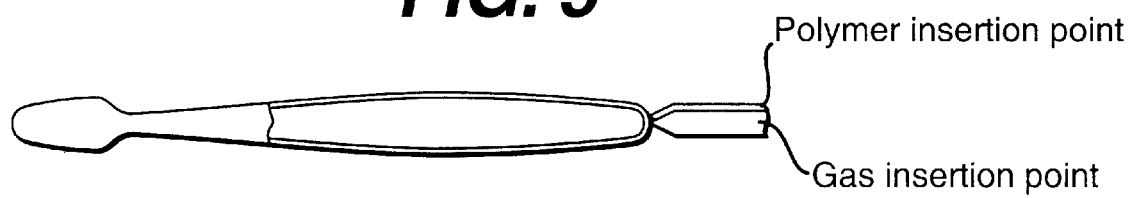

The molten plastic injection port may be positioned anywhere on the toothbrush mold, provided it communicates with the mold cavity. Preferably, however, molten plastic injection port (6) is located near base portion (3) of mold I as illustrated in FIG. 3. More preferably, molten plastic injection port (6) is located in the center of the end (3a) of base portion (3) as illustrated in FIGS. 1 and 2. Even more preferably, the port through which the molten plastic is injected is located concentrically around gas injection port (5) in end (3a) of base portion (3) as illustrated in FIG. 1.

The toothbrush may be made of any well known plastic such as, but not limited to, cellulose acetate propionate, nylon, polyethylene, polypropylene, polycarbonate, poly (ethylene terephthalate) or the like. Mixtures of two or more such plastics may be used. The plastic is heated above its melting point and injected through the molten plastic injection port into toothbrush cavity (7) in toothbrush mold (1). The amount of plastic injected will depend on the size of the toothbrush and the desired thickness of the toothbrush walls. The amount of plastic injected will be less than the total volume of the toothbrush cavity (7) in the toothbrush mold. The amount of plastic injected may range from about 10% to about 90%, preferably from about 20% to about 80% of the total volume of the toothbrush cavity (7), more preferably from about 50% to about 80% of the total volume of cavity (7). It will be understood that lesser amounts of plastic may be used if desired.

Mold 1 includes a gate (not illustrated in the drawings) positioned at the point where molten plastic injection port (6) joins the body of the mold cavity. Various types of such gates and their specific orientation in the mold apparatus are well known in the art. Such gates allow the molten plastic to flow into the toothbrush mold. There are several types of known gates that may be utilized. One type of gate that is useful is an edge gate. An edge gate is shaped like a slot, and has a length ranging from 1 mm to 10 mm, preferably from 5 mm to 7 mm. Although useful, the edge gate may result in excess polymer flowing into the toothbrush mold after the gas has been injected.

A second and preferred type of gate is a point gate. A point gate is circular in shape. The diameter of the gate may range from 1 mm to 10 mm, preferably from 2 mm to 5 mm, even more preferably from 2 mm to 4 mm. An annular gate is particularly preferred. The annular gate contains both outer and inner tubes. The outer diameter of the outer tube of the annular gate may range from 1 mm to 10 mm, preferably from 2 mm to 5 mm, preferably from 2 mm to 4 mm. The diameter of the inner tube of the annular gate may range from about 0.1 mm to 9 mm, preferably from about 0.5 mm to 5 mm Typically, the outer tube is utilized to inject the molten plastic, while the inner tube is utilized to inject the gas.

During the molding operation, at least one gas is injected through gas injection port (5) into cavity (7) to push the molten plastic towards the head portion (2) of the mold and to bring the molten plastic into contact with walls (8) of cavity (7). The gas may be any inert gas, including, but not limited to, air, carbon dioxide, nitrogen, and mixtures thereof The pressure at which the gas is injected may be controlled, so that, if desired, the neck of the toothbrush is left solid. The pressure at which the gas is injected will depend on the type of plastic utilized, the size of the cavity, and the desired thickness of the toothbrush wall. Typically, the gas is injected at pressures ranging from about 340 kPa to about 4000 kPa, preferably from about 700 kPa to about 2800 kPa, more preferably from about 1375 kPa to about 2400 kPa. The pressure of the injected gas may be gradually increased during the gas injection stage, i.e., the initial injection gas pressure may be relatively low, but during the course of the gas injection, the pressure of the gas is increased. The pressure of the gas may be increased uniformly or step-wise throughout the molding cycle.

The gas injection may begin after the molten plastic injection is completed. Alternatively, the gas injection may begin during the molten plastic injection. For example, the gas injection may begin at any time after from about 10% to about 100%, preferably from about 30% to about 90%, more preferably from about 50% to about 80% of the total molten plastic injection has been completed.

The toothbrush is then cooled and released from the mold. In order to further reduce the toothbrush manufacturing cycle time, the gas utilized for the gas injection may be cooled, so as to begin the cooling process. Conventional cooling techniques, such as, but not limited to cool water lines around or in the toothbrush molds and blown air may be utilized to complete the cooling process.

The toothbrush may be finished by utilizing conventional techniques to secure bristles or bristle tufts to the head of the toothbrush. The bristles may be stapled into the head of the toothbrush or fused into or onto the head of the toothbrush. The handle of the toothbrush may be overmolded with materials such as thermoplastic elastomers or rubber. If desired, the overmolding process may be carried out during the above described molding operation. Alternatively, the toothbrush may be transferred to a separate mold for the overmolding process.

Several examples are set forth below to further illustrate the nature of the invention and the manner of carrying it out. However, the invention should not be considered as being limited to the details thereof.

EXAMPLES OF REDUCTION TO PRACTICE

EXAMPLE 1

Gas Flow Perpendicular to the Lengthwise Direction of the Toothbrush Mold

An injection molding machine designed such that the toothbrush mold was injected with molten plastic near the base portion of the toothbrush mold, perpendicular to the lengthwise direction of the toothbrush mold, and the gas was injected at the center of the end of the base portion of the toothbrush mold, parallel to the lengthwise direction of the toothbrush mold, was used in this Example 1. The location of the gas injection port in the center of the end portion of the mold helped ensure that the gas was injected into the central region of the mold cavity. Molten polypropylene (9 grams/75 percent by volume of the capacity of the mold cavity) was injected into the mold. Nitrogen gas was then injected into the mold cavity for about 2 to 3 seconds. The pressure of the gas at the start of the gas injection cycle was about 1724 kPa/second. The gas injection pressure was uniformly increased throughout the gas injection cycle. The pressure of the gas at the end of the cycle was about 2070 kPa/second. The toothbrush was cooled and removed from the mold.

Results

The toothbrush was cut in half along the lengthwise direction of the handle. Although most of the handle was hollow; a mound of residual plastic was seen near the bottom of the handle where the molten plastic was injected. Additionally, the thickness of the wall of the toothbrush was not uniform. The cycle time to produce a solid toothbrush in this mold is typically 32 seconds. When this mold is used to produce a toothbrush having hollow portions as set forth in this Example 1, the process cycle time was reduced to about 24 seconds. The amount of plastic needed to produce a solid toothbrush in this mold is typically 12 grams. The amount of plastic needed to produce a hollow toothbrush according to this Example 1 was about 9 grams.

EXAMPLE 2

Gas Flow from the Center of the Base End of the Toothbrush Mold

The injection molding machine described in Example 1 was modified such that the toothbrush mold was injected with molten plastic at the center of the end of the base portion of the toothbrush mold, parallel to the lengthwise direction of the toothbrush mold. The gas injection port remained located in the center of the end of the base portion of the toothbrush mold. Molten polypropylene (9 grams/75 percent of the capacity of the mold by volume) was injected into the mold. Nitrogen gas at an initial pressure of 1724 kPa was fed into the molten plastic for 3 seconds, with the pressure at the end of the cycle being 2070 kPa/second. The toothbrush was cooled and removed from the mold.

Results

The toothbrush made according to Example 2 was cut in half along the lengthwise direction of the handle. The handle was hollow, and the mound of residual plastic observed in the toothbrush of Example 1 was eliminated. The process of this Example 2 reduced the cycle time to 20 seconds. The amount of plastic utilized to make the toothbrush utilizing the apparatus and process of this Example 2 was 9 grams. The wall of the toothbrush had a substantially uniform thickness.

We claim:

1. A process for manufacturing a toothbrush comprising:
    a) providing a toothbrush mold having a head portion, a base portion, a toothbrush cavity located between said head portion and said base portion and having walls, an injection port for injecting molten plastic, and a gas injection port for injecting at least one gas, wherein the gas injection port is positioned in the end of the base portion of the mold so that gas is injected into the mold cavity substantially centrally thereof and in a direction parallel to the longitudinal axis of the mold, said injection port for the molten plastic being positioned in the center of the end of the base portion of the mold;
    b) injecting a predetermined amount of a molten plastic into the mold cavity to partially fill the cavity; and
    c) injecting at least one gas through the gas injection port to direct the molten plastic into contact with the walls of the mold cavity.

2. The process of claim 1, wherein the molten plastic is selected from the group consisting of cellulose acetate propionate, nylon, polyethylene, polypropylene, polycarbonate, and poly(ethylene terephthalate) and mixtures thereof.

3. The process of claim 1 wherein the amount of molten plastic injected into the mold ranges from about 10% to about 90% of the total volume of the mold cavity.

4. The process of claim 1 wherein the amount of molten plastic injected into the mold ranges from about 20% to about 80% of the total volume of the mold cavity.

5. The process of claim 1 wherein the gas is selected from the group consisting of air, carbon dioxide, nitrogen, and mixtures thereof.

6. The process of claim 5 wherein the gas is injected at a pressure ranging from about 340 kPa to about 4000 kPa.

7. The process of claim 6 wherein the gas is injected at a pressure ranging from about 700 kPa to about 2800 kPa.

8. The process of claim 7 wherein the gas is injected at a pressure ranging from about 1375 kPa to about 2400 kPa.

* * * * *